March 31, 1953  F. LAJEUNESSE  2,633,029
DEVICE FOR STABILIZING THE ORIENTATION OF GYROSCOPES
Filed July 9, 1948
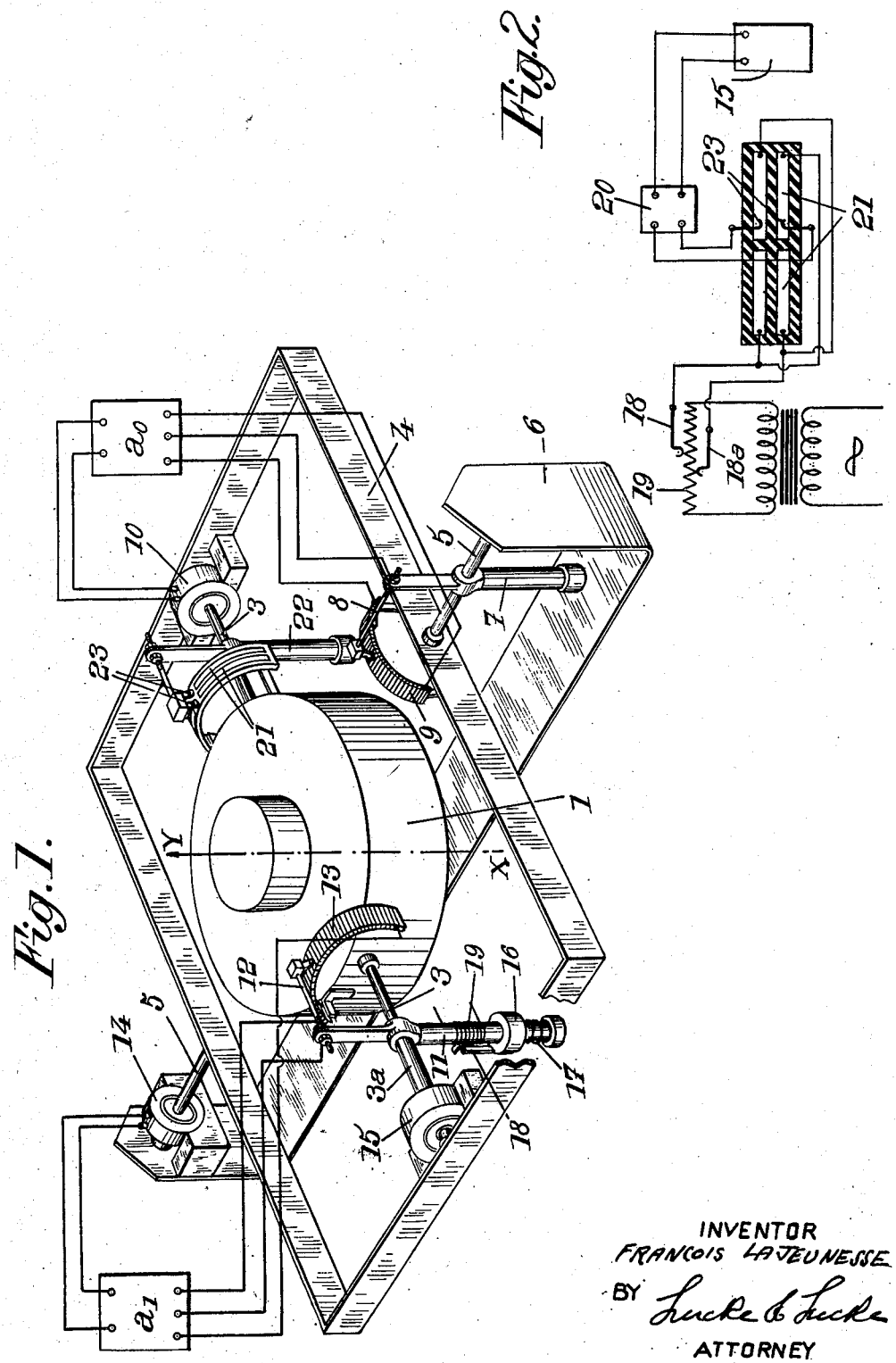
INVENTOR
FRANÇOIS LAJEUNESSE
BY
ATTORNEY Patented Mar. 31, 1953

2,633,029

UNITED STATES PATENT OFFICE 2,633,029

DEVICE FOR STABILIZING THE ORIENTATION OF GYROSCOPES

François Lajeunesse, Paris, France, assignor to Office National d'Etudes et de Recherches Aeronautiques (O. N. E. R. A.), Paris, France, a society of France Application July 9, 1948, Serial No. 37,835
In France December 23, 1947

3 Claims. (Cl. 74—5.47)

The present invention relates to automatic control devices including at least one gravity pendulum which is liable to be influenced, in certain conditions of operation, by a parasitic acceleration having a component transverse to the direction of the action of gravity.

My invention is more especially, although not exclusively concerned, among these automatic control devices with so-called erecting devices as used in connection with gyroscope systems fitted on aircrafts.

It is known to use such erecting devices to compensate for variations of orientation of the gyroscope due, in particular, to friction in the gimbal mounting thereof. These erecting devices, under the effect of their pendular elements, tend to return the axis of the gyroscope into a predetermined direction when said axis is moved away from said direction.

Now, if, for some reason (for instance if the aircraft on which the gyroscope is fitted remains for a long time in a curve), a parasitic acceleration is brought into play which moves the pendular element of the erecting device temporarily away from true vertical and the device will tend to return the gyroscope axis no longer into the predetermined direction but into a new direction depending upon the direction (resultant of the gravity field and of the perturbing parasitic acceleration) assumed by its pendular element, which direction is, as already indicated, different from true vertical. In other words, as long as the parasitic acceleration keeps the pendular element away from true vertical, the mean indications supplied by the erecting device will be wrong, and therefore the rectifying action of said device incorrectly exerted. As a consequence, the operation of the apparatus to which the gyroscope is to supply a constant reference direction is then perturbed.

The chief object of the present invention is to provide a control device of the above mentioned type which is better adapted to meet the requirements of practice than those existing up to now and, in particular, which is free from the above indicated drawbacks.

The invention consists chiefly in subjecting the pendular element of a control device of this type to the action of motor means responsive to variations of the component of the total acceleration acting upon said pendular element which is parallel to the direction of said element about its axis, for imperatively restoring said pendular element into the position it would occupy if said perturbing acceleration had not exerted its detrimental action.

A preferred embodiment of the present invention will be hereinafter described with reference to the accompanying drawings, given merely by way of example and in which:

Fig. 1 diagrammatically shows, in perspective view, a vertical axis gyroscope fitted with a trimming device according to the invention;

Fig. 2 is an electric wiring diagram showing details of this trimming device.

It will be supposed that there is provided, on board an aircraft, an apparatus (artificial horizon indicator, automatic pilot, etc.) including, among other elements, a gyroscope 1 having a vertical axis XY, and that it is desired to provide a trimming device for stabilizing the position of this gyroscope, i. e. for holding axis XY in the reference direction it is to indicate, to wit the true vertical direction.

In the example shown by the drawing, the casing of gyroscope 1 is carried by a spindle 3 parallel to the fore-and-aft direction of the aircraft and journalled in a frame 4 itself carried by a transverse spindle 5 (at right angles to spindle 3), journalled in a support 6 fixed to the aircraft structure, this arrangement of gyroscope 1 being, in fact, the gimbal mounting which makes it theoretically unresponsive to pitch and roll movements of the aircraft.

Now it happens that, as a consequence of frictions in the bearings of spindles 3 and 5, the axis XY of the gyroscope is somewhat deviated by said pitch and roll movements, pitching movements of the aircraft causing frame 4 to swing about the axis of transverse spindle 5, whereas rolling movements result in an oscillation of gyroscope 1 about the axis of longitudinal spindle 3.

In order to oppose these perturbations, it is known to make use of an erecting device of the pendular type, the function of which is theoretically to return the axis XY of the gyroscope into the direction of the gravity field.

This erecting device may be of any conventional type, for instance it may include the following elements:

On the one hand, concerning pitch effect correction, a pendulum 7 mounted to oscillate about transverse spindle 5 and actuating the sliding contact 8 of a potentiometer 9 fixed to frame 4, said potentiometer controlling a motor 10 adapted to drive longitudinal spindle 3, and, on the other hand, concerning roll effect correction, a pendulum 11 mounted to oscillate about longitudinal spindle 3 and actuating the sliding contact 12 of a potentiometer 13 fixed to the casing of gyroscope 1, said potentiometer controlling a motor 14 adapted to drive transverse spindle 5.

$a_0$ and $a_1$ are conventional connection and feed boxes inserted between each motor and the potentiometer through which it is controlled.

It should be noted that, according to a method which is also conventional, disturbances taking place about one of the spindles of the gyroscope support are corrected by exerting a torque on the other spindle, perpendicular thereto.

With an arrangement as just above stated, the axis XY of the gyroscope is truly restored into a direction corresponding to the mean indication supplied by the erecting device, but this direction coincides with true vertical only as long as pendulums 7 and 11 are subjected exclusively to the acceleration of gravity.

Now parasitic accelerations are liable to appear in the course of the evolutions of the aircraft and to exert a non negligible influence upon the direction of said pendulums and therefore, finally, upon that of the gyroscope axis.

The most important of these parasitic accelerations and the only one which will be taken into account in what follows, is that exerted horizontally, in the transverse direction, when the aircraft is rounding a curve. If this curve lasts for some time, the direction reference supplied by the gyroscope may make an angle of several degrees (for instance from 5 to 10° according to the radius of the curve along which the aircraft is travelling and to the speed of this aircraft) with the correct direction it should indicate.

It will be readily understood that this erroneous indication of the gyroscope may bring about serious functional disturbances in the working of the system to which it belongs, for instance a horizon indicator (which will then give an incorrect horizon indication) or an automatic pilot (which will in this case act erroneously upon the controls).

According to the present invention, this drawback is obviated by controlling the position of the pendulum subjected to the action of the perturbing transverse acceleration (in this case pendulum 11) by means of electro-motor means, such for instance as a motor 15 capable of developing a high torque, operated by means responsive to variations of the component of the total acceleration acting upon said pendulum which is parallel to the direction of said pendulum about its axis so as imperatively to return said pendulum into the position it would occupy if this transverse acceleration did not exist, that is to say if it were subjected to the only action of gravity (indication of true vertical).

It will be readily understood that, in this way, having restored pendulum 11 from a position of equilibrium in which it indicated the apparent vertical on board the aircraft (erroneous reference), into a position in which it indicates the true vertical (true reference) the axis XY of the gyroscope, which is located in accordance with the mean position of this pendulum 11, will be finally held, by way of consequence, in the desired direction, to wit that of true vertical.

To connect motor 15 and pendulum 11, the shaft of this motor is for instance coupled with a sleeve $3a$ freely rotatable on spindle 3 and on which said pendulum is fixed.

The means responsive to transverse acceleration for operating motor 15 are made as follows:

Pendulum 11 carries a sliding mass 16 capable of driving, when it moves toward the free end of the pendulum against the action of a spring 17, the sliding contact 18 of a potentiometer 19 supplied with current from an alternating current source.

The terminals of this potentiometer are connected to motor 15 through an amplifier 20 (Fig. 2) so that when the acceleration acting on mass 16 is equal to the acceleration $g$ of gravity, the voltage supplied to motor 15 is zero but when the acceleration acting on mass 16 is higher or lower than $g$, voltages of opposed directions are transmitted to motor 15 (diagram of Fig. 2). An adjustment runner $18a$ makes it possible to adjust the potentiometer connections so that the voltage transmitted to motor 15 is zero when pendulum 11 is vertical and the weight of mass 16 is balanced by spring 17.

It will be understood that the effect of such means will be to move pendulum 11 into a position for which the voltage at the output of potentiometer 19 is zero, that is to say into a position for which the projection of the resultant acceleration on the arm of said pendulum is equal to $g$. Now, as above stated, the preliminary adjustment is supposed to be such that this is the true vertical position of pendulum 11, if the torque of motor 15 is applied in the suitable direction.

Concerning this torque, it should be noted that, if it urged pendulum 11 more and more away from true vertical position, said pendulum would be finally brought into a position (symmetrical of true vertical position with respect to apparent vertical) for which the output voltage of the potentiometer would also be zero.

Now, this final position would not permit of obtaining the desired result (indication of true vertical by pendulum 11). Determination of the direction of the torque of motor 15 is therefore of primary importance and this determination must take into account the direction of the turn (to the right or to the left) made by the aircraft for, according as the aircraft is turning in one direction or the other, the torque must be in one direction or the other.

Consequently, it will be necessary, in order to obtain a direction of the torque of motor 15 corresponding to the direction in which pendulum 11 is being deviated, to provide, in the control circuit of this motor, a reversing switch 21 controlled by a device responsive to the direction (toward the right or toward the left) in which the turn takes place for suitably connecting said motor. Preferably, this reversing switch is located between potentiometer 19 (which translates transverse accelerations into electric variations) and the amplifier 20 for controlling the motor.

According to the embodiment illustrated by the drawings, the direction of the transverse accelerations is indicated by a free pendulum 22 mounted, for instance, on spindle 3 of the gyroscope.

As for reversing switch 21, it is constituted by a group of four conductor strips carried by the casing of gyroscope 1 and connected with the contacts 18 and $18a$ of potentiometer 19 as shown by the diagram of Fig. 2, said strips, insulated from one another, cooperating with brushes 23 connected with the input terminals of amplifier 20. When pendulum 22 is vertical brushes 23 are located on the insulating material between the two pairs of metal strips and the input circuit of amplifier 22 is open.

Thus, as soon as a turn is started, pendulum 22 will close the supply circuit of motor 15, in one direction or the other according as the turn is in one direction or the other. As soon as the turn is completed, brushes 23 return into neutral position and reopen the input circuit of amplifier 20.

A gyroscope system as above described has, over those provided with the conventional straightening device, the advantage of indicating true vertical even when subjected to prolonged transverse accelerations such as would appear in turns or curves.

Of course, all or part of the arrangements above described might be used for eliminating the detrimental action of parasitic accelerations other than transverse acceleration. The gyroscope to be stabilized might have its axis otherwise than vertical. The gyroscope might be mounted on a vehicle other than an aircraft, for instance on an automatically guided projectile or a land or sea vehicle, etc.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use on an aircraft, the combination of a gyroscopic horizon apparatus including a gyroscope mounting and gimbal suspension means for supporting said mounting on said aircraft, an automatic erecting device for stabilizing said gyroscopic horizon apparatus including a longitudinal pendulum pivoted to said suspension means so as to be movable in a plane parallel to the longitudinal plane of symmetry of said aircraft and a transverse pendulum pivoted to said suspension means so as to be movable in a plane at right angles to said plane of symmetry, motor means carried by said suspension means for applying a variable torque on said transverse pendulum about the axis of rotation thereof, means responsive to variations of the difference between the total acceleration component parallel to the direction of said transverse pendulum and the gravity acceleration for controlling said motor means to make the torque exerted by said motor means greater and greater as this difference increases and equal to zero when this difference is zero, and means responsive to the action of a horizontal parasitic acceleration at right angles to the axis of rotation of said transverse pendulum for applying the torque of said motor means to said transverse pendulum in one direction or the opposed one according as said parasitic acceleration is in one direction or the opposed one, so that said torque urges said transverse pendulum toward the true vertical plane of its axis.

2. For use on an aircraft, the combination of a gyroscopic horizon apparatus including a gyroscope mounting and gimbal suspension means for supporting said mounting on said aircraft, an automatic erecting device for stabilizing said gyroscopic horizon apparatus including a longitudinal pendulum pivoted to said suspension means so as to be movable in a plane parallel to the longitudinal plane of symmetry of said aircraft and a transverse pendulum pivoted to said suspension means so as to be movable in a plane at right angles to said plane of symmetry, an electromotor carried by said suspension means for applying a variable torque on said transverse pendulum about the axis of rotation thereof, a mass slidable along the arm of said transverse pendulum, potentiometric means inserted in a control circuit of said electromotor operative by relative displacements of said mass along said arm so as to cause an increase of the torque supplied by said motor as said mass is being moved away from the axis of said transverse pendulum, spring means for suspending said mass on said arm to hold the mass, in the vertical position of said arm and under the only action of the force of gravity, in a given position for which said potentiometric means cause no torque to be developed by said electromotor, and means responsive to the action of a horizontal parasitic acceleration at right angles to the axis of the transverse pendulum for applying the electromotor torque in one direction or the opposed one according as said parasitic acceleration is in one direction or the opposed one, so that said torque urges said transverse pendulum toward the true vertical plane of its axis.

3. For use on an aircraft, the combination of a gyroscopic horizon apparatus including a gyroscope mounting and gimbal suspension means for supporting said mounting on said aircraft, an automatic erecting device for stabilizing said gyroscopic horizon apparatus including a longitudinal pendulum pivoted to said suspension means so as to be movable in a plane parallel to the longitudinal plane of symmetry of said aircraft and a transverse pendulum pivoted to said suspension means so as to be movable in a plane at right angles to said plane of symmetry, an electromotor carried by said suspension means for applying a variable torque on said transverse pendulum about the axis of rotation thereof, a mass slidable along the arm of said transverse pendulum, potentiometric means inserted in a control circuit of said electromotor operative by relative displacements of said mass along said arm so as to cause an increase of the torque supplied by said motor as said mass as being moved away from the axis of said transverse pendulum, spring means for suspending said mass on said arm to hold the mass, in the vertical position of said arm and under the only action of the force of gravity, in a given position for which said potentiometric means cause no torque to be developed by said electromotor, a third pendulum pivoted to said suspension means about an axis coaxial with the axis of said transverse pendulum, and switch means operative by relative movements of said third pendulum with respect to said mounting for controlling the direction of the torque exerted by said electromotor so that it urges said transverse pendulum toward the true vertical plane of its axis.

FRANÇOIS LAJEUNESSE.

REFERENCES CITED

The following references are of record in the file of this patent:

UNITED STATES PATENTS

| Number | Name | Date |
|---|---|---|
| 1,485,783 | Gardner | Mar. 4, 1924 |
| 1,545,479 | Boykow | July 14, 1925 |
| 2,411,987 | Ford et al. | Nov. 12, 1946 |
| 2,419,063 | Fischer | Apr. 15, 1947 |